(12) United States Patent
Huber et al.

(10) Patent No.: US 12,129,359 B2
(45) Date of Patent: Oct. 29, 2024

(54) TAPE ACCELERATOR AND USE THEREOF, SOLID INSULATING MATERIAL, AND ANHYDRIDE-FREE INSULATION SYSTEM

(71) Applicant: Innomotics GmbH, Nuremberg (DE)

(72) Inventors: Jürgen Huber, Erlangen (DE); Mario Brockschmidt, Erlangen (DE); Torsten Rossow, Berlin (DE); Dieter Schirm, Breitengüßbach (DE); Matthias Übler, Ursensollen (DE)

(73) Assignee: INNOMOTICS GMBH, Nuremberg (DE)

( * ) Notice: Subject to any disclaimer, the term of this patent is extended or adjusted under 35 U.S.C. 154(b) by 245 days.

(21) Appl. No.: 17/639,814

(22) PCT Filed: Aug. 11, 2020

(86) PCT No.: PCT/EP2020/072445
§ 371 (c)(1),
(2) Date: Mar. 2, 2022

(87) PCT Pub. No.: WO2021/043541
PCT Pub. Date: Mar. 11, 2021

(65) Prior Publication Data
US 2022/0235199 A1 Jul. 28, 2022

(30) Foreign Application Priority Data
Sep. 4, 2019 (DE) .................... 10 2019 213 420.3

(51) Int. Cl.
*C08K 5/59* (2006.01)
*C08K 5/41* (2006.01)
(Continued)

(52) U.S. Cl.
CPC .................. *C08K 5/59* (2013.01); *C08K 5/41* (2013.01); *H01B 3/446* (2013.01); *H02K 3/30* (2013.01); *H02K 3/32* (2013.01)

(58) Field of Classification Search
CPC . H02K 3/32; H02K 3/30; H01B 3/446; C08K 5/41; C08K 5/59
(Continued)

(56) References Cited

U.S. PATENT DOCUMENTS

| 5,013,814 A | 5/1991 | Roth et al. ...................... 528/90 |
| 2005/0189834 A1 | 9/2005 | Ikeda ............................ 310/179 |

(Continued)

FOREIGN PATENT DOCUMENTS

| CN | 107430899 A | 12/2017 | ............. C08G 59/50 |
| CN | 108028092 A | 5/2018 | ............. C08G 59/62 |

(Continued)

OTHER PUBLICATIONS

German Office Action, Application No. 102019213420.3, 4 pages, Nov. 27, 2019.
(Continued)

*Primary Examiner* — Tremesha S Willis
(74) *Attorney, Agent, or Firm* — Slayden Grubert Beard PLLC

(57) ABSTRACT

Various embodiments of the teachings herein include a cationic tape accelerator for use in a process for producing an insulation system by impregnation and/or encapsulation with an anhydride-free impregnating agent. The tape accelerator comprises an ionogenic compound of a sulfonium-containing cation and a hexafluoroantimonate anion.

12 Claims, 13 Drawing Sheets

(51) Int. Cl.
*H01B 3/44* (2006.01)
*H02K 3/30* (2006.01)
*H02K 3/32* (2006.01)

(58) Field of Classification Search
USPC .................................................. 174/137 B
See application file for complete search history.

(56) References Cited

U.S. PATENT DOCUMENTS

| | | | |
|---|---|---|---|
| 2014/0329023 A1 | 11/2014 | Di Gianni et al. | 427/493 |
| 2018/0053581 A1 | 2/2018 | Huber et al. | |
| 2018/0094177 A1 | 4/2018 | Huber et al. | |
| 2018/0204649 A1 | 7/2018 | Huber et al. | |
| 2018/0215960 A1 | 8/2018 | Huber | C09J 7/381 |
| 2018/0290339 A1 | 10/2018 | Nguyen et al. | |
| 2021/0187915 A1 | 6/2021 | Beisele et al. | |

FOREIGN PATENT DOCUMENTS

| | | | |
|---|---|---|---|
| CN | 109155164 A | 1/2019 | B32B 19/02 |
| DE | 102015205328 A1 | 9/2016 | C09J 171/02 |
| EP | 0611796 A1 | 8/1994 | B29C 39/00 |
| EP | 1 754 733 | 2/2007 | C08G 59/42 |
| EP | 3 292 616 | 3/2018 | H02K 3/40 |
| JP | 03200761 A | 9/1991 | C07C 381/12 |
| RU | 2332736 C1 | 8/2008 | H01B 3/04 |
| RU | 2690115 C1 | 5/2019 | B32B 27/38 |
| SU | 878081 A1 | 12/1983 | H01B 3/04 |
| WO | 2017 033056 | 3/2017 | C08G 59/24 |
| WO | 2018 073652 | 4/2018 | C08G 59/68 |

OTHER PUBLICATIONS

Chinese Office Action, Application No. 202080074748.X, 9 pages, Sep. 23, 2023.
Russian Office Action, Application No. 2022108317/04(017285), 15 pages, Nov. 1, 2023.
Search Report for International Application No. PCT/EP2020/072445, 11 pages, Nov. 18, 2020.
Chernin, et al., "Epoxy Polymers and Compositions," Chemistry, Moscow, 12 pages (Russian w/ English translation), 1982.
Russian Office Action, Application No. 2022108317, 19 pages, Nov. 7, 2022.
Russian Office Action, Application No. 2022108317/04, 13 pages, Mar. 22, 2023.

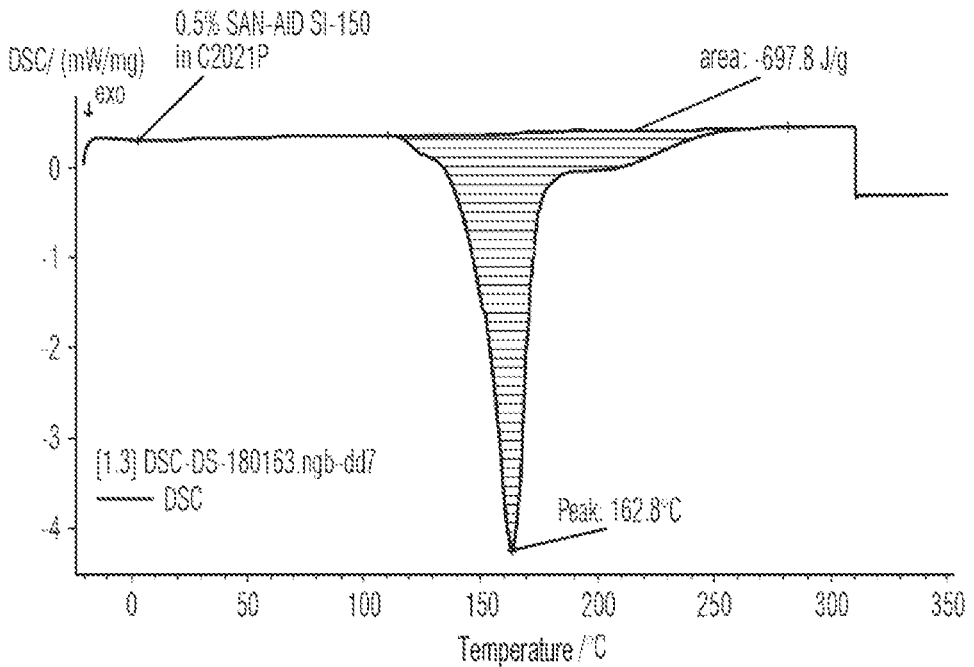
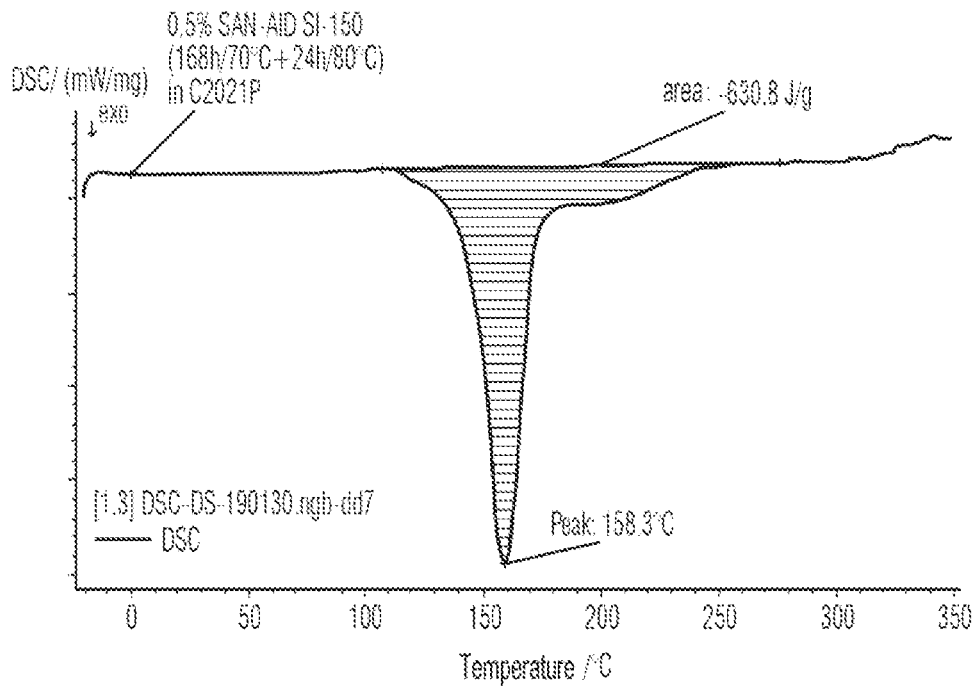

TAPE ACCELERATOR AND USE THEREOF, SOLID INSULATING MATERIAL, AND ANHYDRIDE-FREE INSULATION SYSTEM

CROSS-REFERENCE TO RELATED APPLICATIONS

This application is a U.S. National Stage Application of International Application No. PCT/EP2020/072445 filed Aug. 11, 2020, which designates the United States of America, and claims priority to DE Application No. 10 2019 213 420.3 filed Sep. 4, 2019, the contents of which are hereby incorporated by reference in their entirety.

TECHNICAL FIELD

The present disclosure relates to tape insulation. Various embodiments of the teachings herein may include tape accelerators and/or solid insulation materials for production of an anhydride-free insulation system for engines and generators—for example in the form of a wrapping tape insulation.

BACKGROUND

Rotating electrical machines include an electrical winding within a laminated core, for example a stator winding. The winding is composed of electrical conductors optionally already provided with a primary insulation material, and solid insulation materials as main insulation with respect to the laminated core. Without further measures, there is no intimate bond between the laminated core, the conductors and the main insulation, and so gaps and cavities remain. These regions were filled with air under atmospheric conditions. This is impermissible in the case of applications in the mid- and/or high-voltage sector, for example in the case of motors and generators or electrical drives, since partial electrical discharges in the cavities and gaps would destroy the insulation within a very short period of time. A resulting electrical breakdown, for example, means the failure of the electrical machine.

Therefore, for production of the insulation system, the aim is an intimate connection, as free of bubbles as possible, between the laminated core, the conductors and the main insulation. This is generally achieved by use of solid insulation material that forms a winding, and subsequent impregnation with what is called an impregnating resin because it impregnates the solid insulation material.

In the present disclosure, this liquid resin component is called "impregnating agent" since, as well as the actual resin component, the impregnating resin, it may also comprise curing agent, catalyst(s), diluent, additives, fillers etc. The encapsulation, especially also the impregnation of the solid insulation material in the laminated core with this impregnating agent, can minimize defects.

Suitable solid insulation materials are especially porous insulation materials, for example mica tape, insulation paper, and/or nonwovens, and any combinations thereof. For the insulation of rotating electrical machines in the mid- and/or high-voltage sector, windings made of solid insulation materials have been customary in the art to date, which are impregnated by means of a vacuum-pressure impregnation method—VPI—with mixtures comprising liquid epoxy resins and liquid cyclic acid anhydrides in the impregnating agent.

The solid insulation material is formed not only by a base skeleton optionally present, such as a weave made of reinforcing fibers, but by a barrier material bonded to a tape adhesive. Dissolved and/or ultrafinely dispersed therein is what is called the "tape accelerator", which first initiates the gelation, i.e. the formation of the precured synthetic resin, and then promotes the curing, if the polymerization of the liquid impregnating agent is not itself in progress.

The tape adhesive serves here—for example—for the bonding of mica paper and carrier materials such as films and/or glass weave, whereas the fraction of tape accelerator brings about the gelation of the mobile impregnating resin to give the precured synthetic resin. For this purpose, the liquid impregnating agent penetrating into the winding of solid insulation material leaches the tape accelerator out of the solid insulation material, and hence brings about migration and distribution of the tape accelerator in the impregnating agent. After the gelation, thermal curing of the impregnated winding takes place in the course of production of the finished anhydride-free insulation system.

Since the tape accelerator is included as a depot in the solid insulation material, however, there is never completely homogeneous distribution of the tape accelerator in the impregnating agent in the course of impregnation. Instead, there are regions of high and low tape accelerator concentration. The acid anhydrides—especially cyclic acid anhydrides—present to date in the impregnating agents serve firstly as curing agent for the epoxy groups and simultaneously lower the viscosity of the impregnating agent as a whole, which promotes rapid and complete impregnation of the solid insulation material.

The industrial standard in electrical machines that has become established as impregnating agent is a mixture of distilled bisphenol A diglycidyl ether as impregnating resin and a methylhexahydrophthalic anhydride as anhydride-containing curing agent; the two together result in a very mobile formulation which, in the absence of tape accelerator, has a desirably long storage stability at room temperature and also at impregnation temperature. This long storage stability is manifested, for example, in a doubling of the dynamic initial viscosity only after several weeks, but, in the presence of catalytically active compounds like the tape accelerators, for example, that are deposited in the solid insulation material, the mixture reacts rapidly in the impregnating agent to give the high polymer.

Typically, the preferred tape accelerator is a compound called zinc naphthenate which is obtained from mineral oil. But other synthetic tape accelerators are also known to the person skilled in the art, for example those from EP 0424376 B1. But the cyclic acid anhydrides in the impregnating agent are sensitizing compounds, specifically sensitizing in the respiratory tract. This raises a general question as to their unrestricted usability in future. Methylhexahydrophthalic anhydride (MHHPA) specifically, on account of its respiratory tract-sensitizing capacity, has been treated since December 2012 as a candidate for listing as a possible substance of particularly high concern under the REACh legislation.

The development of entirely anhydride-free insulation systems for rotating electrical generators and machines in the high-voltage sector is thus of great economic interest. But the use of anhydride-free epoxy-based impregnating agents for the impregnation of rotating electrical machines in the mid- and high-voltage sector requires redevelopment of the insulation system as a whole. Specifically the composition of the solid insulation material, i.e., for example, the mica tapes, and the matching of tape adhesive to tape accelerator will have to be reconfigured for the use of anhydride-free impregnating agents.

EP 3227893, EP 3298611 and WO 2017153113 describe solid insulation materials that react with anhydride-free epoxy-based impregnating resins to give insulation systems. EP 3245063 also discloses tape adhesives for solid insulation materials for impregnation with anhydride-free impregnating agents. However, a disadvantage of the systems known to date is that the tape accelerator/tape adhesive/impregnating agent mixtures have too low a reactivity and hence incomplete curing in the regions of the winding with low concentrations of tape accelerators.

More particularly, these tape accelerators, over and above concentrations of about 1% by weight or less, no longer have sufficient efficacy, and so, on completion of impregnation of the solid insulation material with the impregnating agent and gelation and subsequent curing, there are still liquid and non-polymerized portions of the impregnating resin in an amount that prevents formation of a durable insulation system having a small number of defects such as air bubbles.

Table 1 shows, as an example, the enthalpy of reaction of anionic tape accelerators known to date, which do react with an anhydride-free impregnating agent, but react too weakly in catalytic amounts of 1% by weight or less, as always present in some regions of the insulation on encapsulation, in regions with a low concentration of tape accelerator.

| Conc. of anionic accelerator/% w/w | Enthalpy of reaction/Jg$^{-1}$ |
|---|---|
| 6.5 | −378.8 |
| 0.5 | −8.3 |

An enthalpy of reaction of −378 Jg$^{-1}$ is sufficient for a stable insulation system, but an enthalpy of reaction of −8.3 Jg$^{-1}$ is not. The proportions of as yet unpolymerized impregnating agent can be measured via DSC—differential scanning calorimetry—as incomplete curing via the exothermicity of reaction. FIGS. 1 and 2 show the DSC measurements for table 1.

There are already known tape accelerators having better activity, especially tape accelerators having cationic action, i.e. what are called cationic tape accelerators, for example based on quaternary ammonium compounds, but these have the disadvantage that they do not withstand, without damage, the increases in temperature relative to room temperature that occur in the course of winding and/or production of the solid insulation material with incorporated tape accelerator.

SUMMARY

The teachings of the present disclosure include tape accelerators for incorporation in a solid insulation material with tape adhesive suitable for formation of an insulation system with an anhydride-free impregnating agent. The tape accelerator, deposited in the solid insulation material during the impregnation method, shows sufficient efficacy as tape accelerator in regions of the winding with low accelerator concentration. For example, some embodiments of the teachings herein include a cationic tape accelerator for use in a process for producing an insulation system by impregnation and/or encapsulation with an anhydride-free impregnating agent containing an ionogenic compound composed of one or more sulfonium-containing cation(s) with one or more hexafluoroantimonate anion(s).

In some embodiments, the sulfonium-containing cation present is at least one arylalkylsulfonium cation.

In some embodiments, the sulfonium-containing cation present is at least a dialkylarylsulfonium cation and/or a diarylalkylsulfonium cation.

In some embodiments, a substituted aryl radical is present in at least one type of sulfonium-containing cation.

In some embodiments, the aryl group comprises a phenyl ring which is acetyloxy-substituted.

In some embodiments, the tape accelerator has the following chemical structure:

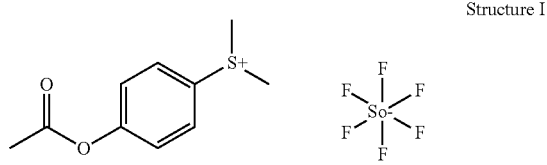

Structure I

As another example, some embodiments include a solid insulation material, comprising a barrier material, a tape adhesive and a tape accelerator in the form of a compound as described herein.

In some embodiments, the barrier material is in the form of platelets.

In some embodiments, there is a carrier. In some embodiments, the carrier comprises a weave, a nonwoven, a film and/or a perforated film.

In some embodiments, there is a tape adhesive in the form of a thermoplastic polyvinylacetal and/or a liquid polyester that may comprise hydroxy groups and/or carboxyl groups.

In some embodiments, there is a tape adhesive in the form of a polyvinylacetal based on butyraldehyde and/or acetaldehyde.

As another example, some embodiments include an insulation system comprising a winding of a solid insulation material impregnated with an anhydride-free impregnating agent as described herein.

As another example, some embodiments include an electrical machine comprising an insulation system as described herein.

BRIEF DESCRIPTION OF THE DRAWINGS

FIGS. 7 and 8 show a concentration of less than 1% by weight of tape accelerator in a typical impregnating resin, here a cycloaliphatic epoxy resin.

DETAILED DESCRIPTION

Various embodiments of the teachings herein include an anhydride-free insulation system producible by vacuum-pressure impregnation—VPI—methods. Such an insulation system comprises a solid insulation material from which the anhydride-free insulation system is produced by impregnation and/or encapsulation with an impregnating agent and subsequent curing. Some embodiments include a cationic tape accelerator for use in a process for producing an insulation system by impregnation and/or encapsulation with an anhydride-free impregnating agent containing an ionogenic compound composed of one or more sulfonium-containing cation(s) with one or more hexafluoroantimonate anion(s).

In some embodiments, a cationic tape accelerator for use in a process for producing an insulation system by encapsulation with an anhydride-free impregnating agent, includes a chemical compound covered by one of the structural formulae I, II and III:

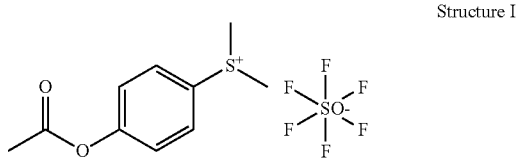

Structure I

Figure 1:
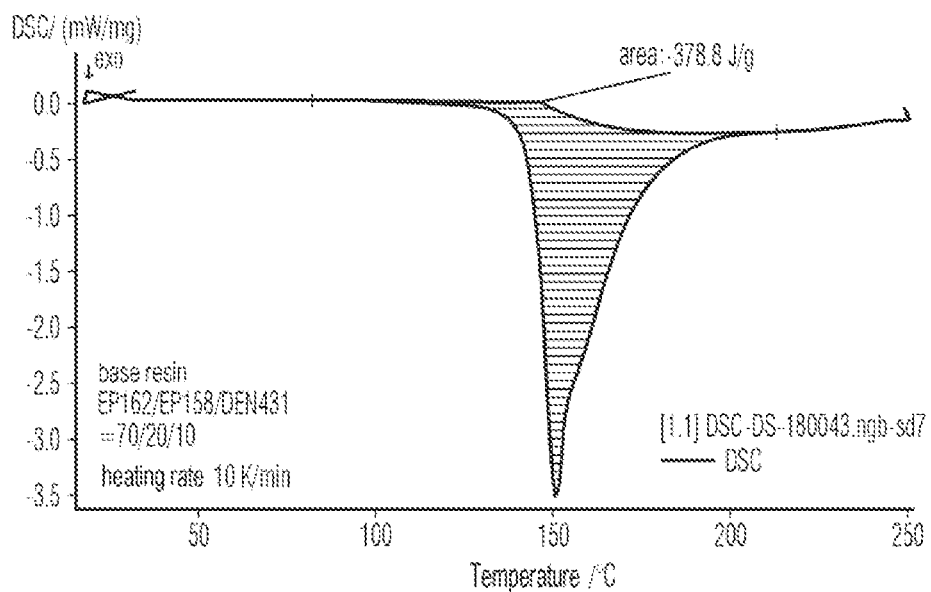
FIGS. 1 and 2 show the DSC measurements for table 1.
Figure 2:
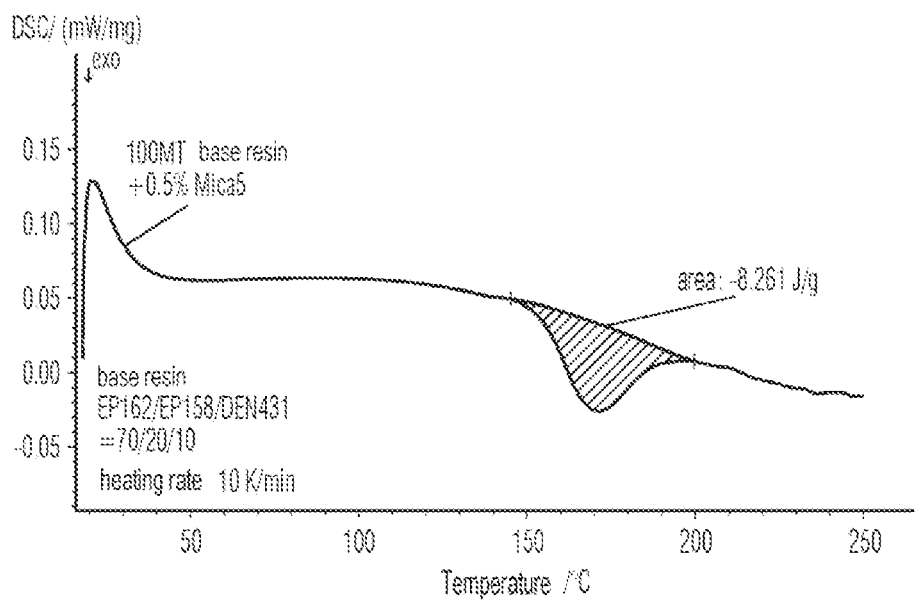
Figure 3:
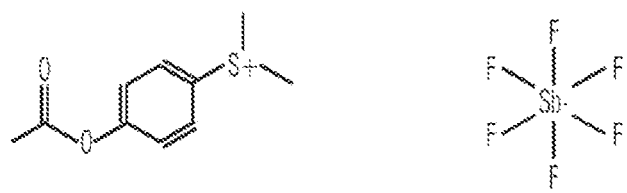
FIG. 3 shows the structural formula "structure I" of a cationic tape accelerator in one embodiment of the teachings of the present disclosure.

FIG. 3 shows the structural formula "structure I" of a cationic tape accelerator in one embodiment of the teachings of the present disclosure. Some embodiments include use of the tape accelerator for production of an anhydride-free insulation system by impregnating the solid insulation material with an impregnating agent, wherein the impregnating agent comprises an aromatic and/or cycloaliphatic impregnating resin which is anhydride-free and epoxy-containing.

Some embodiments include an autonomously tradable intermediate, a solid insulation material comprising a barrier material, a tape adhesive and a tape accelerator, wherein the tape accelerator is a cationic tape accelerator and contains an ionogenic compound composed of a sulfonium-containing cation with a hexafluoroantimonate anion, for example 4-acetyloxyphenyldimethylsulfonium hexafluoroantimonate—CAS No. 135691-31-5—structure I.

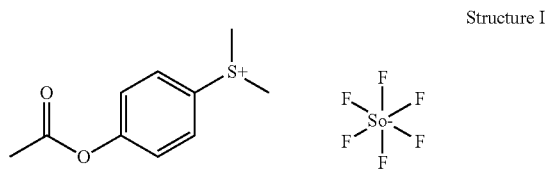

Structure I

Some embodiments include an insulation system producible by encapsulation of a solid insulation material with a tape accelerator containing an ionogenic compound composed of a sulfonium-containing cation with a hexafluoroantimonate anion, especially a compound of the structural formula I with an anhydride-free impregnating agent. A compound of the structure I is more particularly a compound commercially available under the 4-acetyloxyphenyldimethyl-sulfonium hexafluoroantimonate name.

In some embodiments, a solid insulation material containing an ionogenic compound composed of a sulfonium-containing cation with a hexafluoroantimonate anion as cationic tape accelerator, especially the compound of the structural formula I at least in large portions, reacts with an anhydride-free impregnating resin, especially one that is epoxy-based, even in regions with low tape accelerator concentrations, i.e. in regions with tape accelerator concentrations of 1% by weight or less, to such an extent that the epoxy-based anhydride-free impregnating resin gelates and/or cures sufficiently for production of the insulation system during the encapsulation, such that a sufficiently stable insulation system with a tolerable number of defects is producible in the proven VPI production processes and corresponding VPI systems. An insulation system producible with the tape accelerator of the invention, in terms of defects, is comparable to the conventional insulation systems producible with anhydride-containing impregnating agents according to prior art.

A "cationic tape accelerator" refers to a tape accelerator which is ionogenic, and the cation of which, in a liquid impregnating agent, initiates the cationic polymerization, especially the cationic homopolymerization, of a latent impregnating resin.

An "ionogenic" compound refers to heteropolar compounds, the chemical reactivity of which is shaped by the presence of a cation and an anion in the compound. Conventional "ionogenic" compounds are salts. But complex structures having cationic and anionic character are also referred to in the present context as "ionogenic" compounds.

A "sulfonium-containing cation" is a cation comprising, in the molecule, as well as the anion(s), a unit described by the singly positively charged structures II or III or by the empirical formula $[SR_3]^+$.

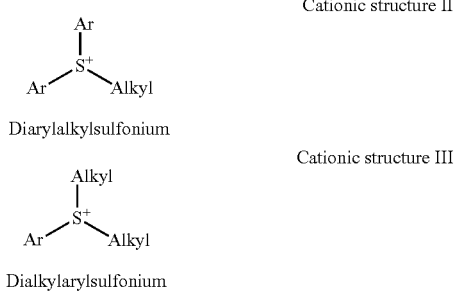

"Alkylarylsulfonium or dialkylarylsulfonium" refers here to a sulfonium-containing cation in which one or two of the three "R" radicals on the sulfur atom in the sulfonium cation are alkyl groups. Alkyl groups are parts of a molecule consisting of carbon and hydrogen atoms bonded to one another. In some embodiments, the alkyl radicals are those having 1 to 12 carbon atoms that may be branched or linear. The alkyl groups here are bonded monovalently to the central sulfur atom.

In some embodiments, in a dialkylarylsulfonium cation, there may be one or two alkyl radicals which may in turn be the same or different. "Arylalkylsulfonium or diarylalkylsulfonium" refers here to a sulfonium-containing cation in which one or two of the three "R" radicals on the sulfur atom in the sulfonium cation are aryl groups. Aryl groups are parts of a molecule which are monovalent pendants on the carbon skeleton, or on the sulfur atom, and have at least one aromatic ring that may be partly or wholly substituted or unsubstituted.

In some embodiments, in an arylalkylsulfonium cation, there may be one or two aryl radicals which may in turn be the same or different. The third radical here may be any radical, i.e. may also be an alkyl group or an aryl group, wholly or partly substituted or not.

An aryl group is an organic chemical radical with an aromatic base skeleton. It is the term for a monovalent group of atoms that derives from aromatic hydrocarbons by removal of a hydrogen atom bonded to the ring. Most aryl groups derive from benzene; the simplest aryl group is the phenyl group.

In some embodiments, there is at least one aryl group in the sulfonium cation. In some embodiments, when there is at least one mononuclear aryl group, i.e., for example, an aryl group having an aryl structure derived from benzene, for example phenyl or benzyl. In some embodiments, when there is at least one substitution in a mononuclear aromatic radical of the aryl group of the sulfonium-containing cation, i.e. one hydrogen on the aromatic ring has been replaced, for example by a functional group or an alkyl group.

The functional group may be present here with or without a heteroatom, such as oxygen, nitrogen, sulfur, phosphorus.

In some embodiments, there is an aryl group in which a hydrogen on the aromatic ring has been replaced by an acetyloxy group.

In some embodiments, the tape accelerator present is a sulfonium-containing cation combined with a hexafluoroantimonate anion.

In some embodiments, essentially one compound is present as cationic tape accelerator. In some embodiments, the tape accelerator takes the form of a mixture of at least two cationic tape accelerators, each of which has a different sulfonium cation. The anions may be the same or different. More particularly, the anion provided is hexafluoroantimonate.

In some embodiments, the mixing ratios are 1000 parts first tape accelerator to 1 part second tape accelerator up to equal proportions of first and second tape accelerators. There may be 100 parts of the first tape accelerator mixed with 1 part of the second tape accelerator. In some embodiments, there are 10 parts of the first tape accelerator mixed with 1 part of the second tape accelerator.

In some embodiments, the tape accelerator, no matter whether present as a single compound or as a mixture, has a melting point in the range from 145° C. to 165° C., especially preferably in the range from 155° C. to 160° C.

"Solid insulation material" refers more particularly to a composite composed of a carrier, a barrier material, a tape adhesive and the tape accelerator. According to the size and shape of the barrier material, a carrier is present or is not. The carrier is thus optional.

The barrier adhesive used is an electrically insulating material, especially one that can be bonded in the form of particles to a sheetlike structure, for example a tape, a paper or the like. Mica may be used, because mica also combines particularly high breakdown resistance with high thermal stability. But it is possible here to use all barrier materials that are suitable for incorporation of the tape accelerator according to the invention and for production of an insulation system after encapsulation, impregnation and curing.

In some embodiments, the barrier material is at least partly in platelet form.

In some embodiments, there is a carrier in the solid insulation material in the form of woven material, for example glass fiber weave, nonwoven material, for example nonwoven, and especially a polyester nonwoven, paper and/or film. The carrier here in the form of a film may also be perforated. In some embodiments, a particulate barrier material is present on, in and/or atop this carrier in the solid insulation material.

In some embodiments, there is a tape adhesive in the form of a glycidyl ether epoxy resin in the solid insulation material. It is especially preferable here when the glycidyl ether epoxy resin is present with repeat units from n=0 to n=50, from n=1 to n=30, or from n=2 to n=18. The tape adhesive may alternatively comprise epoxy novolak and/or epoxy-phenol novolaks, especially in those with repeat units from n=0.1 to n=8.

In some embodiments, the solid insulation material comprises a tape adhesive in the form of a thermoplastic polyvinylacetal and/or a polyester, for example a liquid polyester. In some embodiments, the polyester comprises hydroxyl groups and/or carboxyl groups as functional units. Possible polyvinylacetals are, for example, butyraldehyde and/or acetaldehyde.

In principle, the epoxy-containing tape adhesives show less good properties together with the tape accelerators incorporating teachings of the present disclosure than epoxy-free tape adhesives. The tape adhesive is in the form of a blend, for example, such that fractions of epoxy-containing compounds are present together with the thermoplastic polyvinylacetals and/or the polyesters, so the properties of the thermoplastic polyvinylacetals and/or of the polyesters are dominant in the blend that forms the tape adhesive.

The tape adhesive combines the at least one carrier and the barrier material in the solid insulation material of the insulation system. It is present in the solid insulation material in an amount in the range from 1% to 30% by weight, 2% to 15% by weight, or 5% to 10% by weight.

The tape accelerator is incorporated into the solid insulation material that takes the form of a tape, for example, hence the term "tape accelerator". This can be effected, for example, by two-dimensional application. For example, the tape accelerator is incorporated into the solid insulation material with a coat weight of 0.1 to 5 g/m². It may be incorporated with a coat weight of 0.25 to 2 g/m² or a coat weight of 0.5 to 1.5 g/m².

As already mentioned above, the impregnating agent essentially comprises an impregnating resin, but may also comprise further components—for example for modification of the processing properties and/or the molding material properties—such as curing agent, catalyst, diluent, additive, filler etc. A suitable impregnating resin in the impregnating agent contains a cationically polymerizable monomer and/or oligomer. More particularly, a suitable impregnating resin contains one or more anhydride-free compound(s) having oxirane and/or epoxy groups. This/these compound(s) may be wholly or partly in aromatic, aliphatic and/or cycloaliphatic form.

Examples include the following compounds as suitable impregnating resins alone or in mixtures, polymeric blends and copolymers:
  epoxy resin, especially bisphenol A and/or bisphenol F epoxy resin,
  novolaks
  aliphatic epoxy resins
  cycloaliphatic epoxy resins
  glycidyl ether and/or glycidyl ester compound(s) of the aforementioned resins and
  any desired mixtures, blends, copolymers of the aforementioned resins.

In some embodiments, blends of cycloaliphatic epoxy resins with aromatic glycidyl ether epoxy resins are suitable impregnating resins. In some embodiments, the impregnating resin is a mixture of at least one 3,4-epoxycyclohexyl 3',4'-epoxycyclo-hexanecarboxylate with an aromatic epoxy resin, for example a bisphenol A and/or F diglycidyl ether.

One example of a formulation of an impregnating resin is a mixture of aliphatic and/or aromatic epoxy resin with at least one cycloaliphatic epoxy resin. The mixing ratio of aliphatic and/or aromatic epoxy resin to cycloaliphatic epoxy resin here may assume values in the range from 80:20 to 5:95—each expressed in parts by mass. In some embodiments, mixing ratios here are in the range from 50:50 to 10:90, or from 30:70 to 15:85.

A tape accelerator incorporating teachings of the present disclosure in association with an anhydride-free impregnating agent may offer benefits that are elucidated hereinafter by figures that show, also in combination with anhydride-free impregnating agents, measurements on illustrative tape accelerators, including in comparison with prior art compounds. The extent of the reactivity of a tape accelerator having the structural formula I in regions of low tape accelerator concentrations during the encapsulation is also detectable via DSC measurements, as will be shown hereinafter.

Regarding the thermal stability of the tape accelerator according to structure I. The tape accelerator of the structure I is a tape accelerator which is cationically active.

There are already known cationically active tape accelerators, for example based on quaternary ammonium compounds, but these have the drawback of low thermal stability, even at temperatures well below 100° C., i.e. noticeable decomposition at processing temperatures of 50° C. to 70° C. This is generally at least disadvantageous for use in the production of insulation systems because temperatures around 70° C. can occur in the course of production of the solid insulation material and also in the course of heating of the conductor prior to the pressure impregnation and prior to contact with the impregnating agent.

By contrast, the tape accelerator of structure I does not show any significant change even after a thermal treatment at 70° C. for 168 h. This can also be detected again via DSC measurements. The tape accelerator of structure I at room temperature is a white crystalline solid, the melting point of which can be determined by DSC. If the tape accelerator of structure I is altered and/or breaks down as a result of a thermal treatment, this would result in melting point depression.

Figure 4:
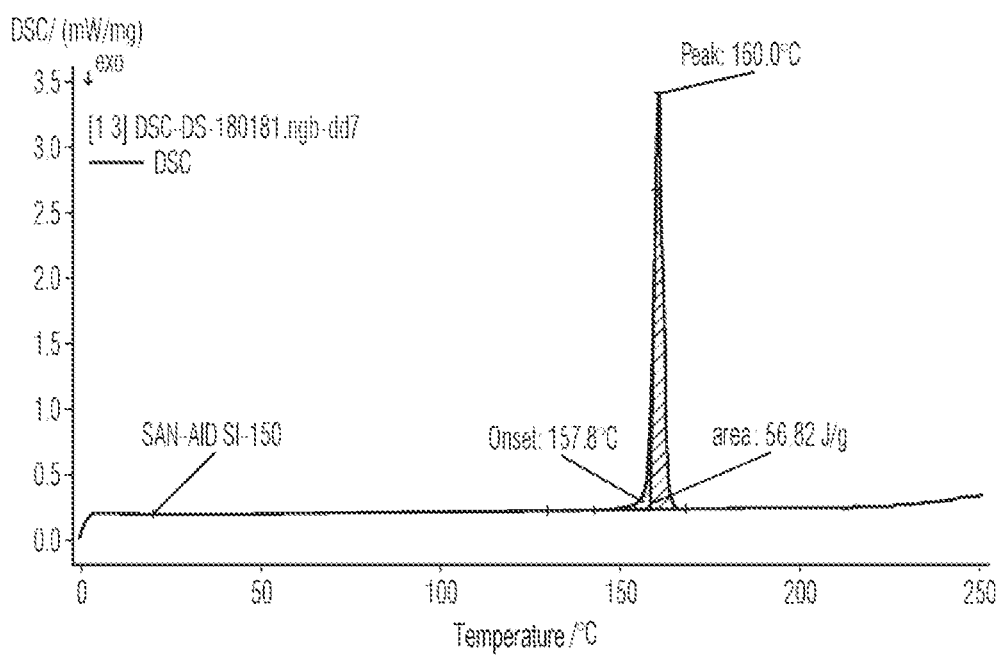
FIGS. 4 and 5 show the results of tests on a sample incorporating teachings of the present disclosure.
Figure 5:
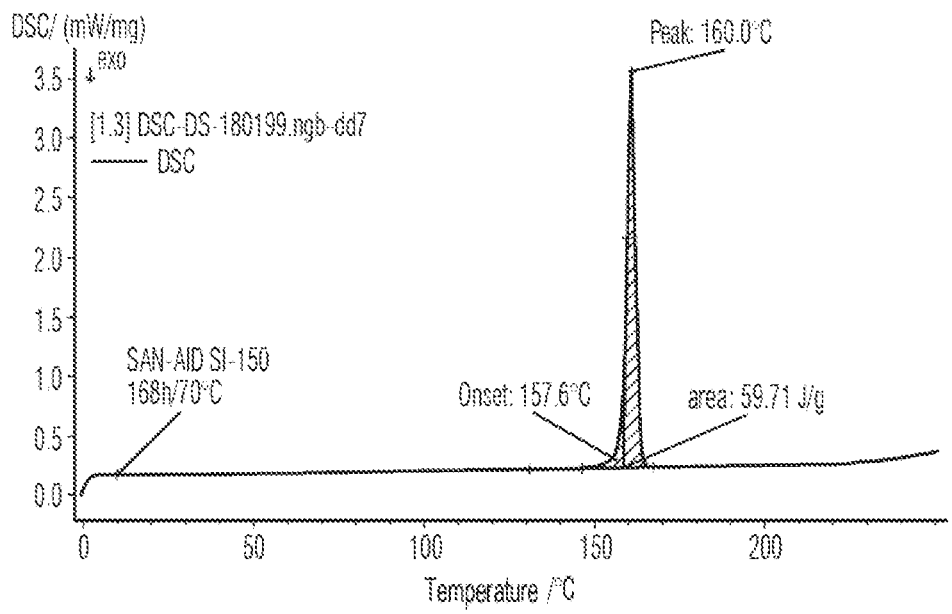

FIGS. 4 and 5 show the results of the corresponding tests. FIG. 4 shows a sample of the tape accelerator of structure I at room temperature, with a melting point of 160° C. known from the literature. FIG. 5 shows the same sample after a thermal treatment at 70° C. for 168 h. Melting point unchanged.

Figure 6:
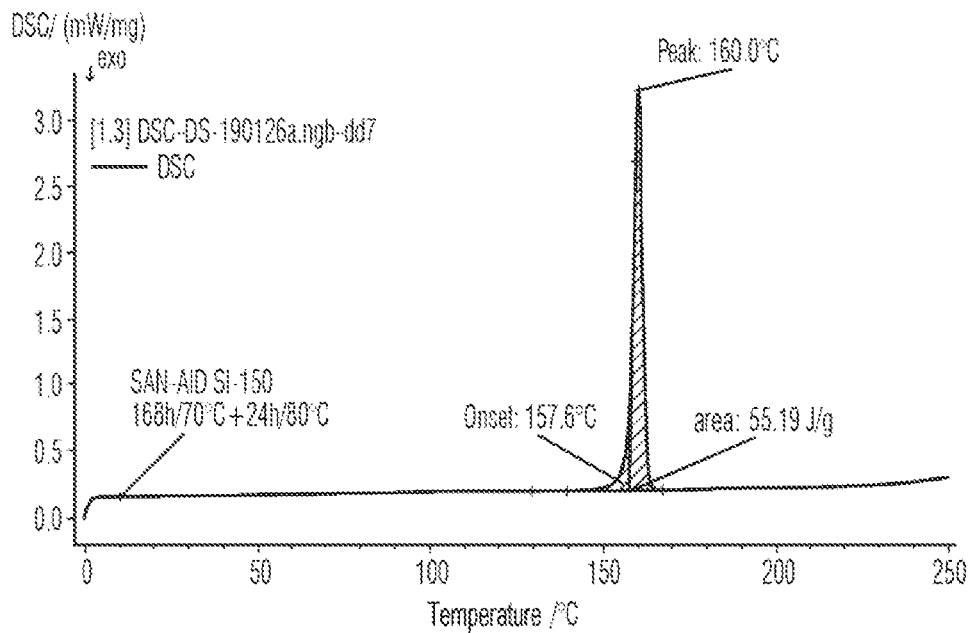
FIG. 6 shows the same sample again, which, after the measurement that can be seen in FIG. 5, has been subjected to thermal treatment at 80° C. for a further 24 h.

FIG. 6 show the same sample again, which, after the measurement that can be seen in FIG. 5, has been subjected to thermal treatment at 80° C. for a further 24 h. Melting point still unchanged. As shown impressively by FIGS. 4 to 6, the tape accelerator of structure I can withstand the thermal stresses unchanged that occur during the production of a wrapping tape insulation and during the preparations for impregnation with impregnating agent.

Firstly, the compound withstands the thermal stresses unchanged; secondly, an ionogenic compound composed of a sulfonium-containing cation with a hexafluoroantimonate anion, using the example here of the compound of structure I, also maintains its reactivity toward the impregnating resin, for example the cycloaliphatic Celloxide 2021P.

FIGS. 7 and 8 show a concentration of less than 1% by weight of tape accelerator in a typical impregnating resin, here a cycloaliphatic epoxy resin. FIG. 7 shows the reactivity of the fresh tape accelerator, and FIG. 8 shows the reactivity by comparison after a thermal treatment like FIG. 6, i.e. the same tape accelerator after storage at 70° C. for 168 h and at 80° C. for 24 hours. The reactivity, like the melting point before, of the compound used remains unchanged.

By way of comparison, the same tests were done with a quaternary ammonium hexafluoroantimonate as tape accelerator.

Figure 9:
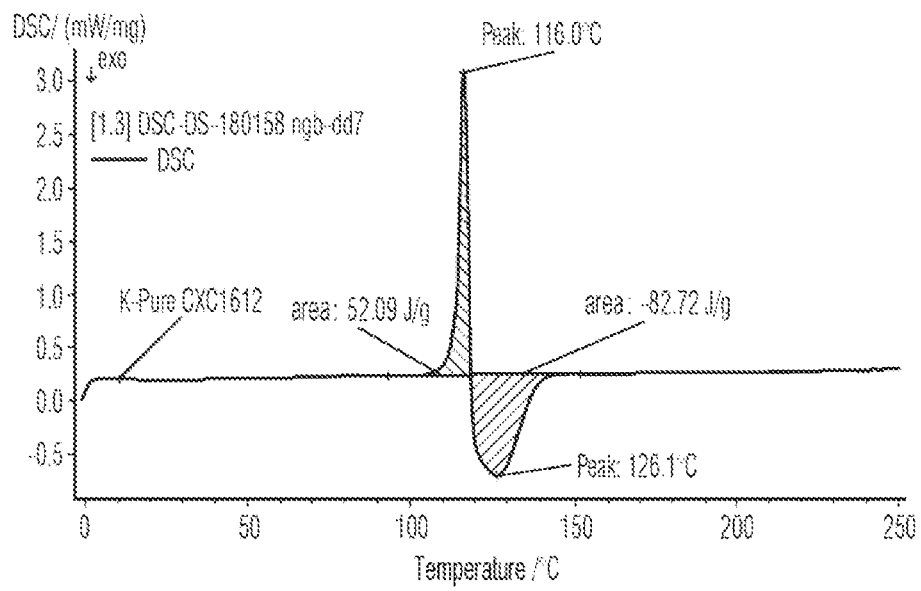
FIG. 9 shows the DSC measurement for determination of the melting point of fresh N-(p-methoxybenzyl)-N,N-dimethyl-anilinium hexafluoroantimonate.

N-(p-Methoxybenzyl)-N,N-dimethylanilinium hexafluoroantimonate in the fresh state is likewise a white crystalline solid, like the sulfonium hexafluoroantimonate tested in FIGS. 3 to 8. FIG. 9 shows the DSC measurement for determination of the melting point of fresh N-(p-methoxybenzyl)-N,N-dimethylanilinium hexafluoroantimonate. There is a clearly apparent peak at 116° C., which indicates the melting point.

Figure 10:
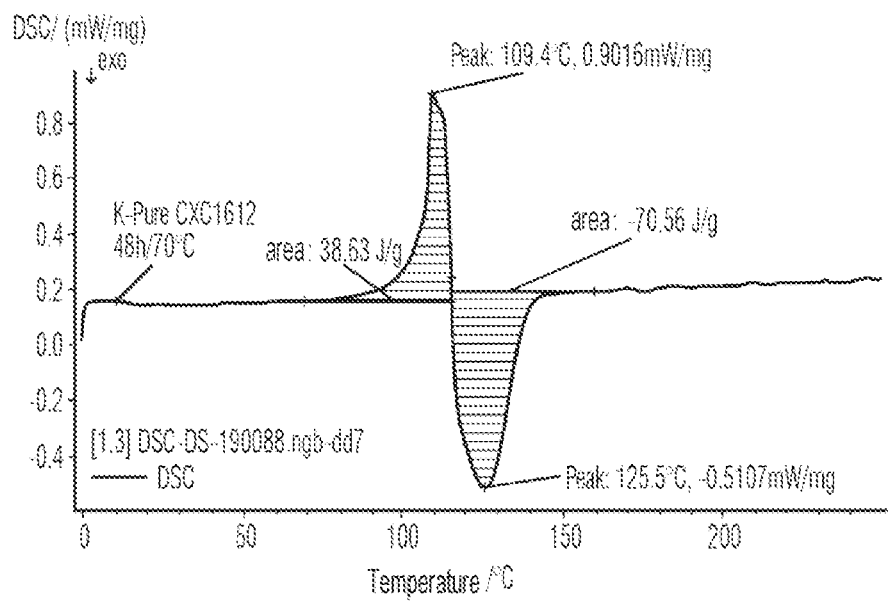
FIG. 10 shows the same sample after a thermal treatment at 70° C. for 48 hours.
Figure 11:
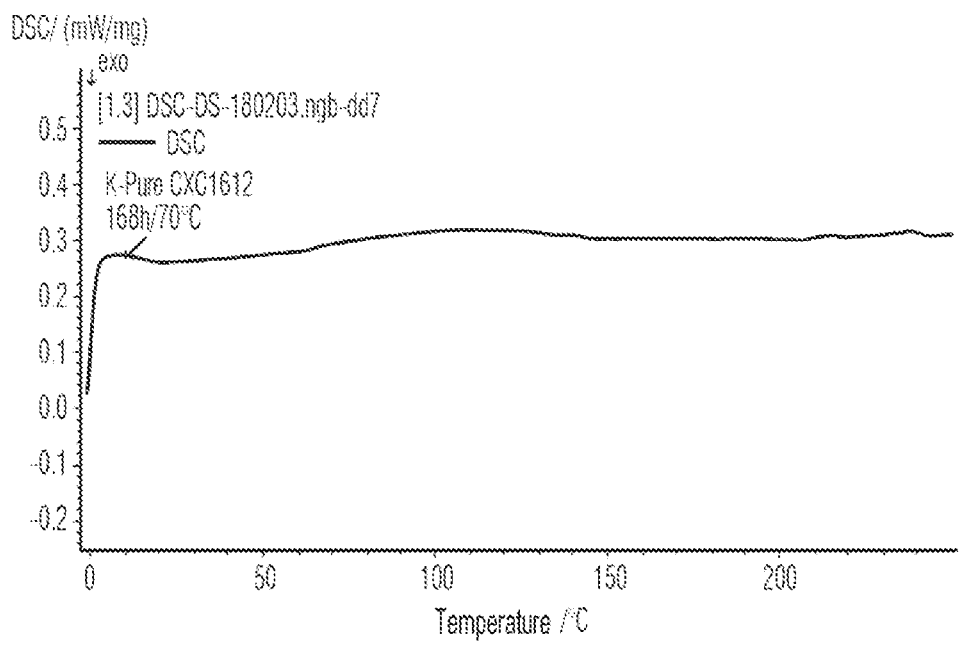
FIG. 11 shows the same measurement on the same sample after a thermal treatment at 70° C. for 168 h.

FIG. 10 shows the same sample after a thermal treatment at 70° C. for 48 hours. The spectrum has quite clearly changed, meaning that the substance is no longer in its original state. A peak at 109° C. shows the melting point depression through contamination. FIG. 11 shows the same measurement on the same sample after a thermal treatment at 70° C. for 168 h. There is quite clearly no longer any apparent melting point.

Figure 12:
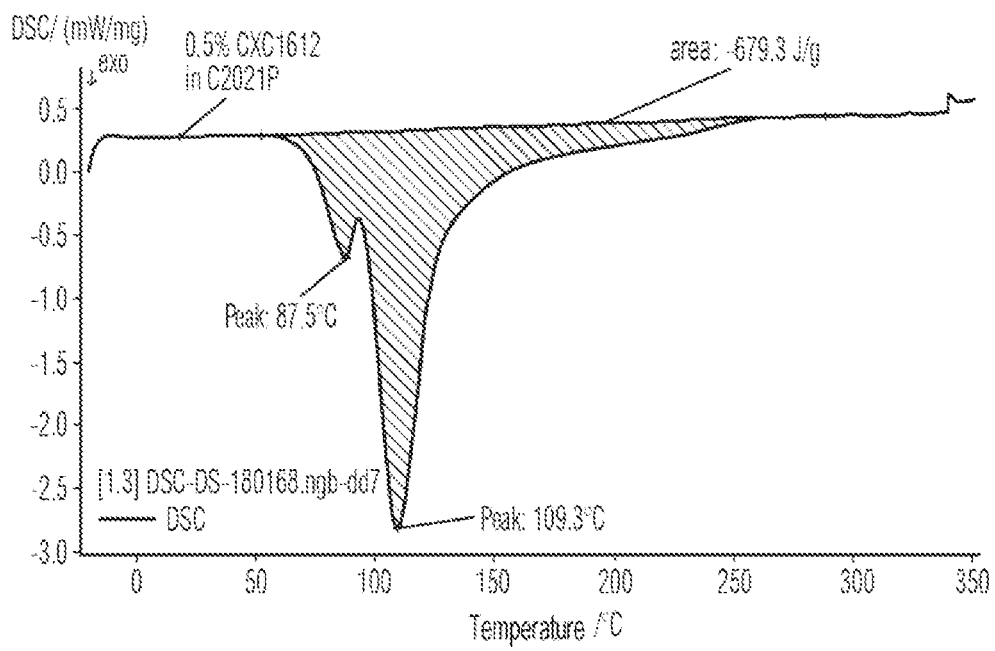
FIG. 12 shows the reactivity of the prior art comparative sample, N-(p-methoxybenzyl)-N,N-dimethylanilinium hexafluoroantimonate, measured against the cycloaliphatic epoxy resin, Celloxide 2021P.
Figure 13:
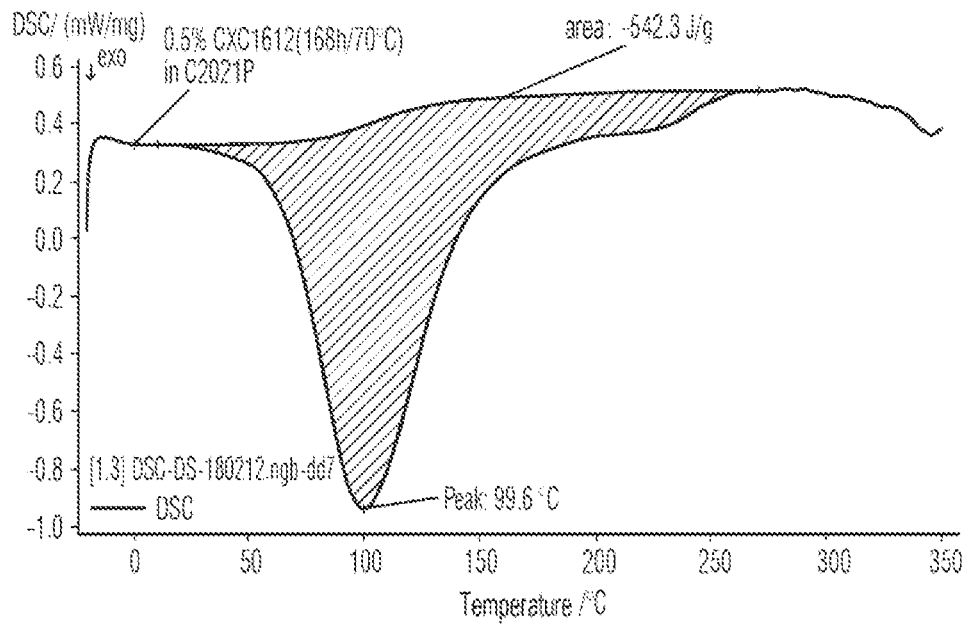
FIG. 13 shows the curing reaction of the prior art tape accelerator, N-(p-methoxybenzyl)-N,N-dimethylanilinium hexafluoroantimonate, that has been stored at 70° C. for 168 hours.

For comparison with FIGS. 7 and 8, the result is again quite clear because FIG. 12 shows sufficient reactivity of the system with the fresh N-(p-methoxybenzyl)-N,N-dimethylanilinium hexafluoroantimonate, but the comparison with the N-(p-methoxybenzyl)-N,N-dimethylanilinium hexafluoroantimonate that has been stored at 70° C. for 48 h is actually considerably less favorable with regard to reactivity and—as shown by FIG. 13—the curing reaction of the prior art tape accelerator, N-(p-methoxybenzyl)-N,N-dimethylanilinium hexafluoroantimonate, that has been stored at 70° C. for 168 hours is greatly reduced.

Some further tests hereinafter show impressively which properties and/or advantages are possessed by the cationic tape accelerator based on a sulfonium cation, especially a dialkylarylsulfonium cation, compared to a standard impregnating resin mixture of aromatic diglycidyl ether epoxy resin—for example EP162—and cycloaliphatic epoxy resin—for example C2021P. Of the two resin components, those used may be those which produce blends of very low viscosity in the mixture because the impregnation of the solid insulation material is possible particularly efficiently therewith.

Table 2 shows the viscosities of blends of commercial epoxy resins at temperatures of 50° C. to 70° C.:

TABLE 2

| | Viscosity/mPa s | | | |
|---|---|---|---|---|
| | Impregnating resin composition | | | |
| Temperature | 80% EP162 20% C2021P | 50% EP162 50% C2021P | 30% EP162 70% C2021P | 20% EP162 80% C2021P |
| 50° C. | 176.1 | 103.4 | — | 64.53 |
| 60° C. | 98.82 | 58.92 | — | 39.41 |
| 70° C. | 48.99 | 34.31 | — | 24.58 |

Figure 14:
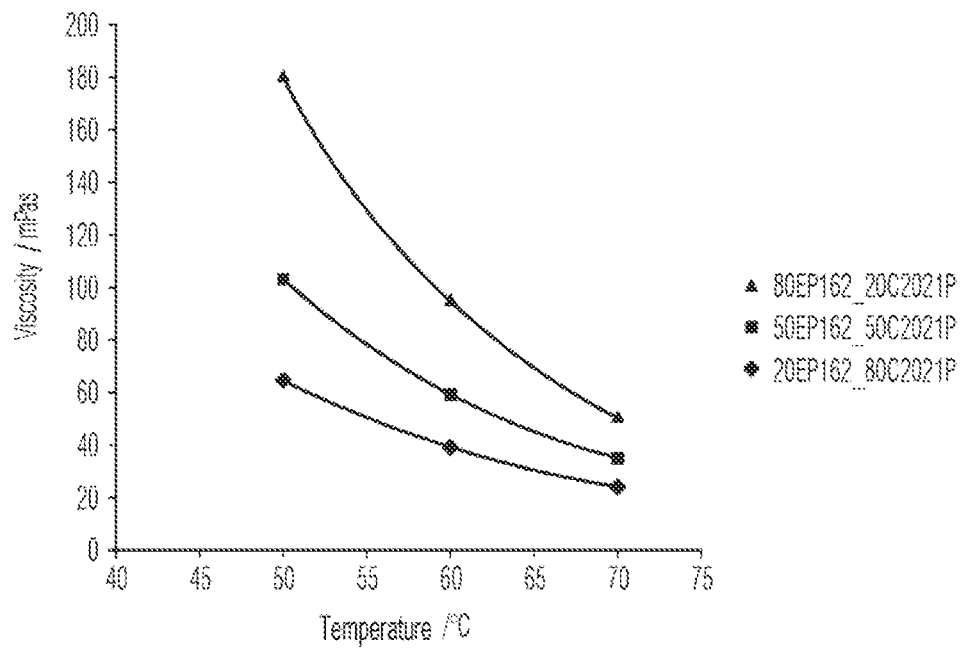
FIG. 14 shows the graphical representation of table 2.

FIG. 14 shows the graphical representation of table 2. The decreasing viscosity with rising temperature is clearly apparent.

Various tape accelerator concentrations were added to these mixtures of impregnating resin. The cationic tape accelerator according to a preferred working example of the present invention is represented here as "SI-150", a trade name under which the compound "4-acetyloxyphenyldimethylsulfonium hexafluoroantimonate" is available.

By varying the concentration of tape accelerator, the impregnating resin composition and the impregnation temperature, it is possible to control the reactivity and/or the gelation time and the sensitivity toward low tape accelerator concentrations.

Tables 3 to 5 show the results of the adjustment of the gelation time via the tape accelerator concentration and/or the impregnating resin composition and/or the temperature.

Tables 3 to 5:

| | Gelation times (60° C.)/h | | | |
|---|---|---|---|---|
| SI-150 concentration in the | Impregnating resin composition | | | |
| impregnating resin | 80% EP162 20% C2021P | 50% EP162 50% C2021P | 30% EP162 70% C2021P | 20% EP162 80% C2021P |
| 2% | — | — | 18.2 | 15.0 |
| 1.5% | — | — | — | 15.7 |
| 1% | 55.5 | 31.8 | 24.0 | 19.4 |
| 0.1% | — | — | — | — |

| | Gelation times (70° C.)/h | | | |
|---|---|---|---|---|
| SI-150 concentration in the | Impregnating resin composition | | | |
| impregnating resin | 80% EP162 20% C2021P | 50% EP162 50% C2021P | 30% EP162 70% C2021P | 20% EP162 80% C2021P |
| 2% | — | 7.6 | 6 | 5.05 |
| 1.5% | — | — | — | 5.8 |
| 1% | 19.9 | 11.5 | 8.6 | 6.8 |
| 0.1% | 58.1 | 39.3 | 30.2 | 24.5 |

| | Gelation times (75° C.)/h | | | |
|---|---|---|---|---|
| SI-150 concentration in the | Impregnating resin composition | | | |
| impregnating resin | 80% EP162 20% C2021P | 50% EP162 50% C2021P | 30% EP162 70% C2021P | 20% EP162 80% C2021P |
| 2% | — | — | — | 2.9 |
| 1.5% | — | — | — | 3.1 |
| 1% | — | — | — | 4.1 |
| 0.1% | — | — | — | — |

Figure 15:
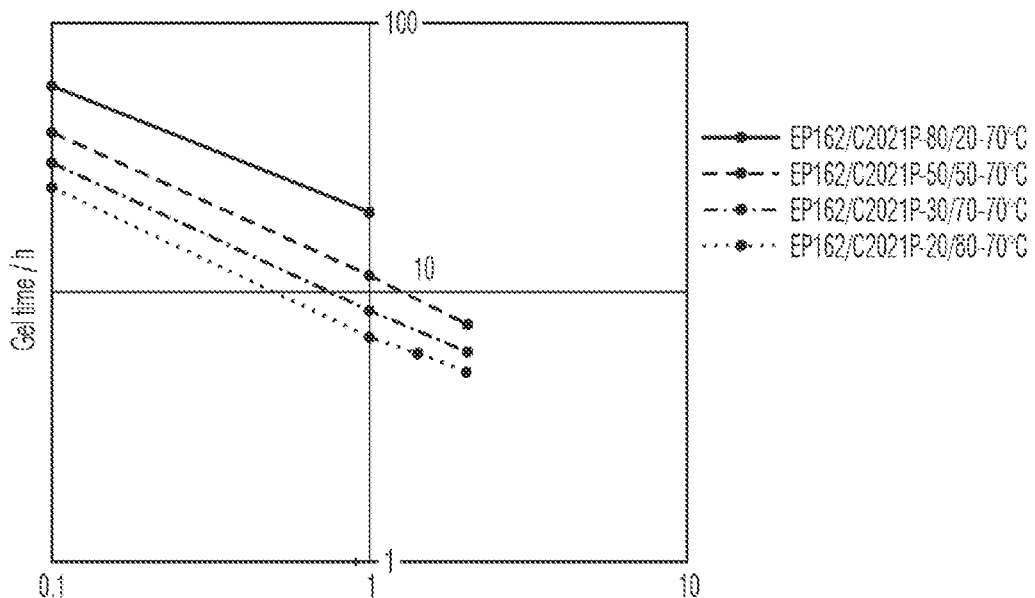
FIG. 15 shows the gelation times of mixtures of EP162 and C2021P at 70° C. as a function of the concentration of SI-150.

FIG. 15 shows the gelation times of mixtures of EP162 and C2021P at 70° C. as a function of the concentration of SI-150. The gelation time increases with rising tape accelerator content, but clear gelation is still apparent even at a very low concentration of 0.1% of tape accelerator, and so such low concentrations of the tape accelerator are sufficient in one working example of the invention to arrive at a stable insulation system.

Figure 16:
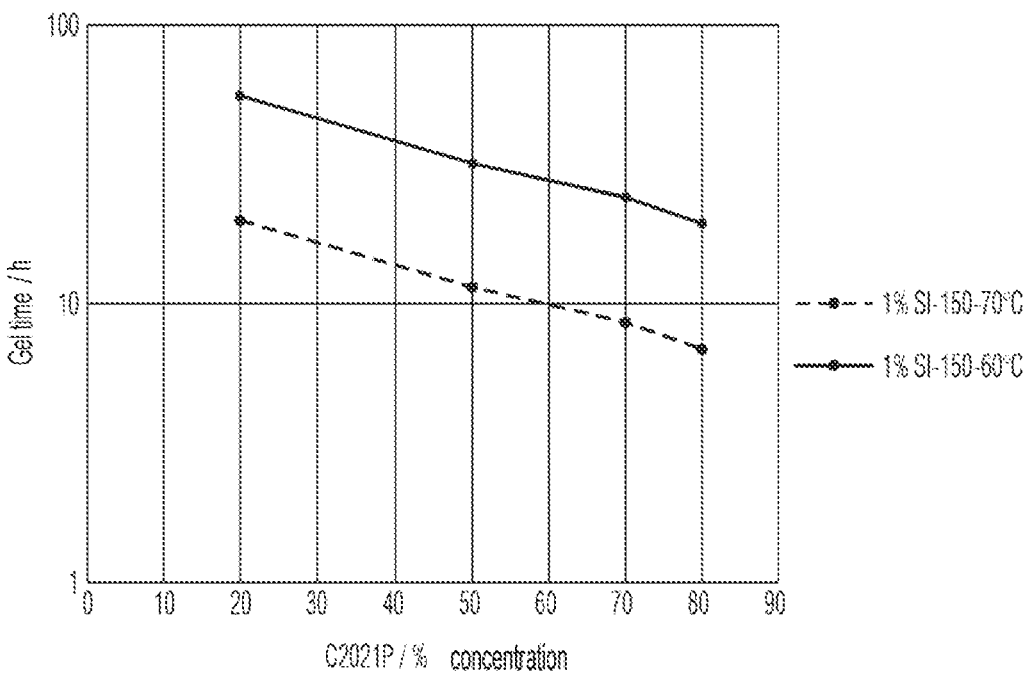
FIG. 16 shows, by comparison, the gelation times at the same concentration of tape accelerator, but at different temperatures and different mixing ratios in the impregnating resin.

FIG. 16 shows, by comparison, the gelation times at the same concentration of tape accelerator, but at different temperatures and different mixing ratios in the impregnating resin. Here too, it is again clearly apparent that, in the case of a low concentration of 1% SI-150 with various concentrations of cycloaliphatic epoxy resin in the mixture of the impregnating resin, good gelation times are achievable in each case at 60° C. and 70° C.

Figure 17:
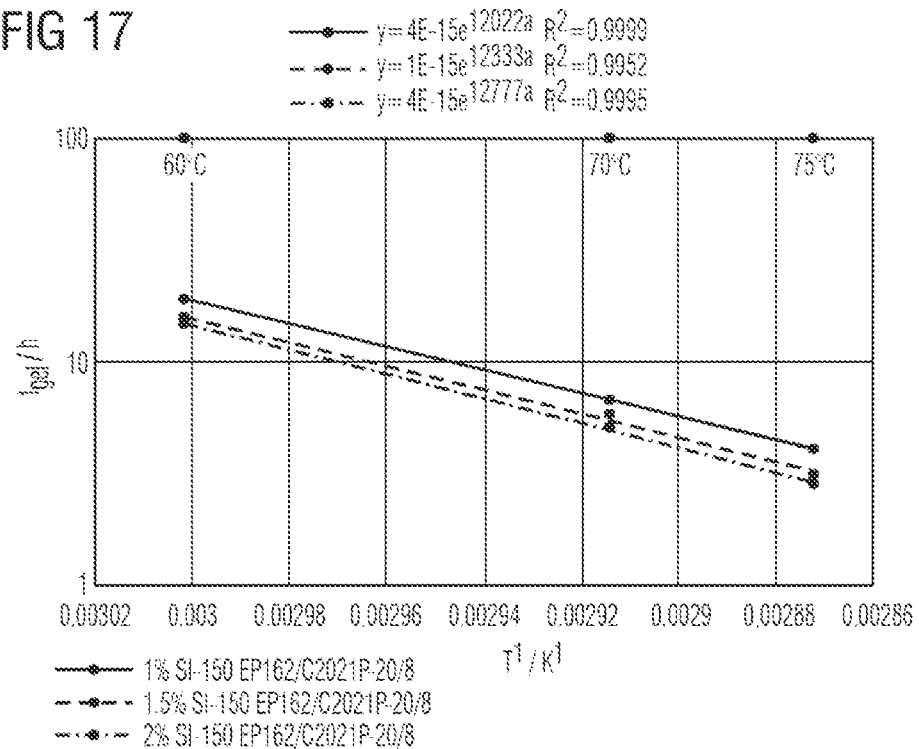
FIG. 17 shows the gelation times of mixtures of 20% EP162 and 80% C2021 with various concentrations of tape accelerator as a function of temperature.
Figure 18:
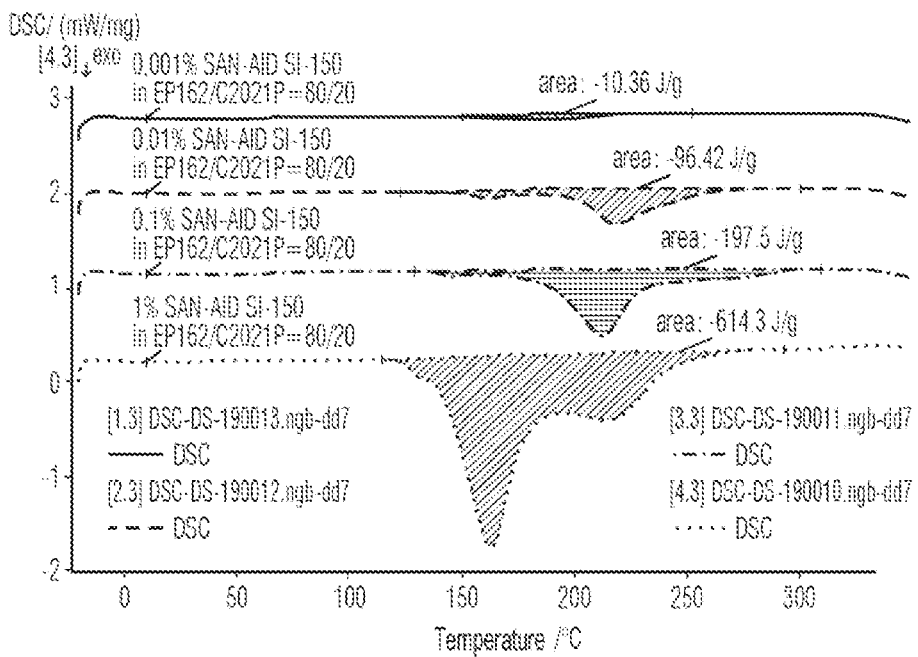
FIGS. 18 to 21 show the curing reactions with various blends in the impregnating resin at such low tape accelerator concentrations as 1%, 0.1%, 0.01% and finally 0.001% of tape accelerator.
Figure 19:
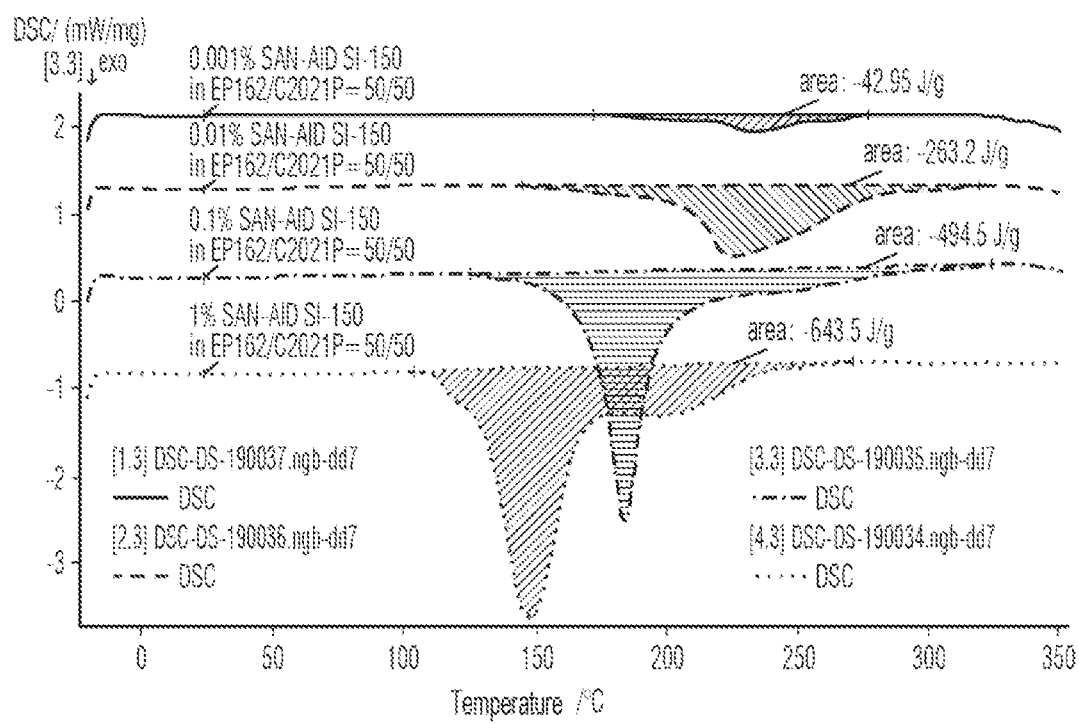
Figure 20:
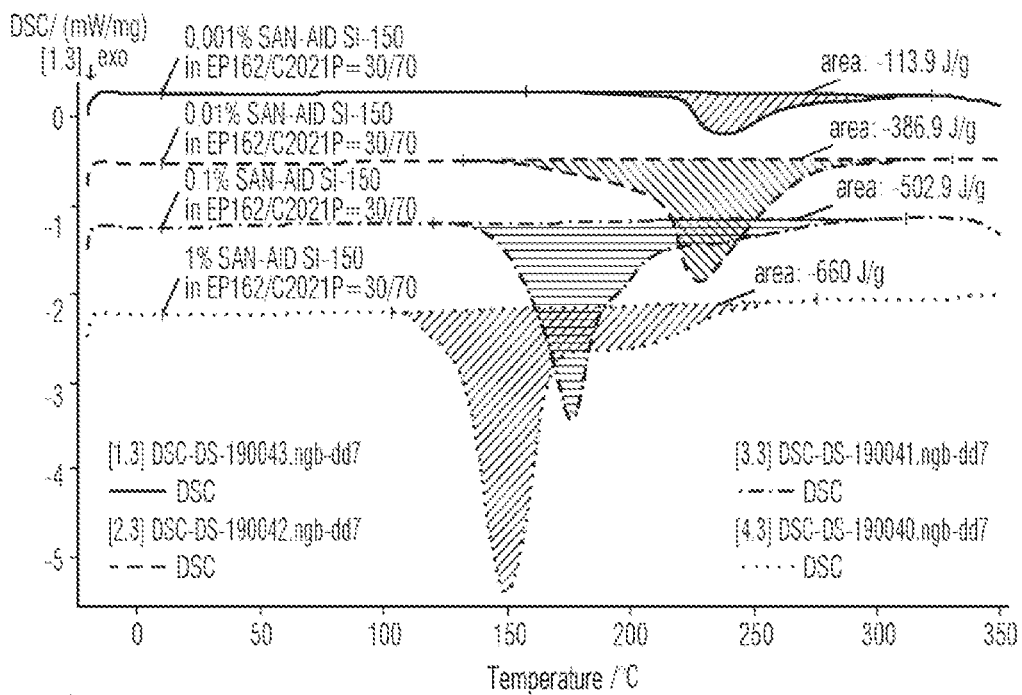
Figure 21:
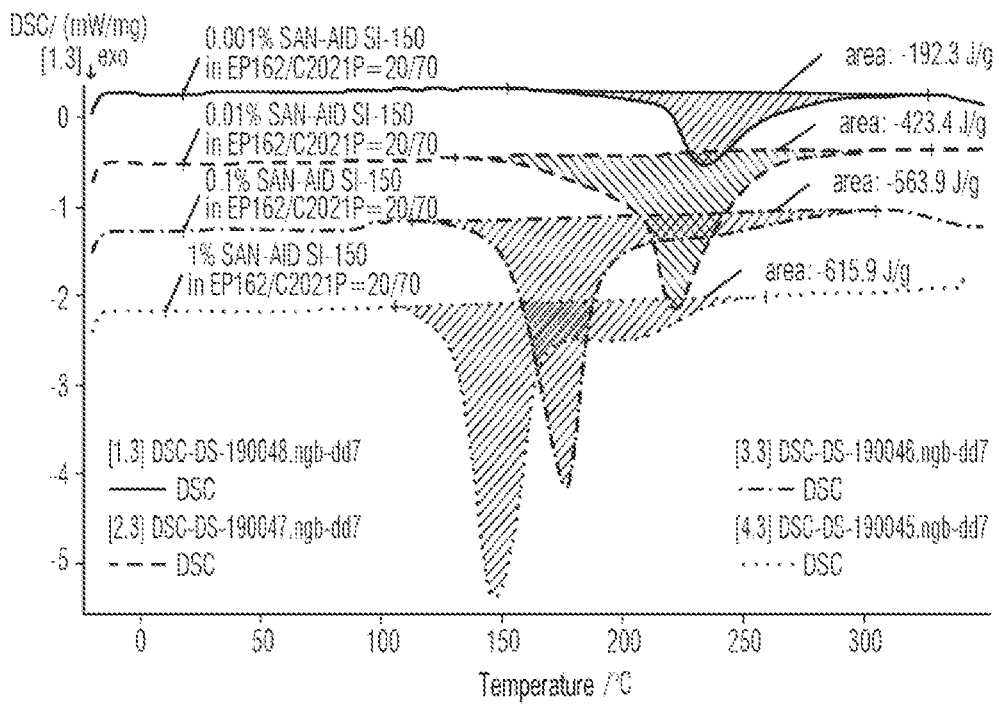

FIG. 17, finally, shows the gelation times of mixtures of 20% EP162 and 80% C2021 with various concentrations of tape accelerator as a function of temperature.

The tests described above were all conducted with the tape accelerator as one compound. Completely surprisingly, however, it was recognized that a mixture of the tape accelerator component can also bring about a distinct reduction in gelation times. By addition of a further cationic sulfonium hexafluoroantimonate compound, benzyl (4-hydroxyphenyl)methylsulfonium hexafluoroantimonate, abbreviated hereinafter to SI-100, in addition to the tape accelerator SI-150, the following gel times summarized in table 6 are obtained:

TABLE 6

| | Gelation times in 20% EP162 80% C2021P/h | | |
|---|---|---|---|
| | Accelerator concentration | | |
| Temperature/° C. | 1% SI-150 | 1% SI-150 0.01% SI-100 | 1% SI-150 0.1% SI-100 |
| 60 | 19.4 | 5.4 | 2.4 |
| 70 | 6.8 | 3.7 | 1.4 |
| 75 | 4.1 | 2.2 | 0.8 |

It is possible via the composition of the impregnating resin to adjust the reactivity and/or sensitivity of the impregnating resin blend with the tape accelerator blend. It has thus been found that, completely surprisingly, with a rising proportion of cycloaliphatic epoxy resin in the impregnating resin composition, the tape accelerator SI-150 is still reactive even at such low concentrations of tape accelerator as 0.001% to result in through-curability.

This is summarized in table 7:

TABLE 7

| | Exothermicity of reaction (DSC)/J g$^{-1}$ | | | |
|---|---|---|---|---|
| SI-150 concentration in the | Impregnating resin composition | | | |
| impregnating resin | 80% EP162 20% C2021P | 50% EP162 50% C2021P | 30% EP162 70% C2021P | 20% EP162 80% C2021P |
| 1% | −614.3 | −643.2 | −660 | −615.9 |
| 0.1% | −197.5 | −494.5 | −502.9 | −563.9 |
| 0.01% | −96.42 | −263.2 | −386.9 | −423.4 |
| 0.001% | −10.36 | −42.95 | −113.9 | −192.3 |

FIGS. 18 to 21 show the curing reactions with various blends in the impregnating resin at such low tape accelerator concentrations as 1%, 0.1%, 0.01% and finally 0.001% of tape accelerator. It is clearly apparent in the uppermost graph that, with rising content of cycloaliphatic epoxy resin C2021P, through-curing still occurs significantly at a tape accelerator content of 0.001. For maximum through-curing in the complete mica tape insulation, mixtures having a proportion of 70% or more of cycloaliphatic epoxy resin, for example C2021P, are a particular option.

Finally, the properties of the tape accelerator were examined in combination with tape adhesives. In the solid insulation material, i.e., for example, in the mica tape, the tape adhesive binds the particles of the mica platelets, for example, to give a tape, which ideally shows storage stability for at least 3 months, even better for 6 months or longer.

What is understood by storage stability is that, firstly, the processing characteristics thereof are constant. This may be verified—for example in the case of a tape—via a change in the flexural rigidity thereof. The change in flexural rigidity was measured, and the results are shown in tables 8 and 9, and in FIGS. 22 and 23.

Examples of conventionally used mica tape adhesives include aromatic glycidyl ether epoxy resins, for example bisphenol A glycidyl ether or epoxidized novolaks. When sulfonium cations with hexafluoroantimonate are used as tape accelerator, these tape adhesives are only of limited suitability. This can be comprehended from the storage stability of the correspondingly formed solid insulation materials. The storage stability is apparent via measurement of the flexural rigidity.

For example, a conventional solid insulation material that has been treated with a tape accelerator according to the invention, for example SI-150, in a coat weight of 1 g per meter has an increase in flexural rigidity by more than 50% at 40° C. even after 4 weeks. A comparative sample of the same solid insulation material that has not undergone treatment by two-dimensional application of SI-150, by contrast, does not show any increase in flexural rigidity.

Flexural rigidity is a measure of the processibility of the solid insulation material and is desirably as close as possible to 0—for example for production of a winding. In general, flexural rigidities of greater than 70 to 75 N per meter are considered to be borderline in respect of the processing.

Table 8 shows the comparison of the two mica tapes Poroband 4037 from Isovolta, once with subsequent application of SI-150 and once without.

TABLE 8

| Storage treatment | Flexural rigidity of Poroband 4037 + 1 gsm SI-150/ N m$^{-1}$ | Flexural rigidity of Poroband 4037/ N m$^{-1}$ |
|---|---|---|
| Initial | 60.9 | 50.4 |
| 2 weeks/40° C./23% RH | 80.6 | 48.8 |
| 4 weeks/40° C./23% RH | 92.0 | 45.1 |

In tests, it has been found that tape adhesives without epoxy groups, for example thermoplastic polyvinylacetals, especially in the case of acetalization with butyraldehyde and/or acetaldehyde, and/or liquid polyesters with hydroxyl groups and/or carboxyl groups, by contrast, do not show any significant increase in flexural rigidity in the case of the same aftertreatment with SI-150.

For example, a mixture of the Mowital® BA55HH polyvinylacetal from Kuraray and the Rokrapol 7075 carboxyfunctional polyester from Robert Kraemer can be used to formulate a tape adhesive that has comparatively good properties to the conventional epoxy-containing tape adhesives, but shows distinctly better storage stability in combination with SI-150.

A mica tape specimen of the composition
12.25 g/m$^{-2}$ Rokrapol 7075
2.00 g/m$^{-2}$ Mowital BA55HH
1.00 g/m$^{-2}$ SAN-AID S1-150
shows only a rise in flexural rigidity of 14% after storage at 40° C. for 4 weeks. The absolute value of 70-75 N/m$^{-2}$ is not exceeded either.

Table 9 shows the corresponding measurement results:

TABLE 9

| Storage treatment | Flexural rigidity of HMK001 (1 gsm SI-150)/ N m$^{-1}$ | Change compared to initial value/% |
|---|---|---|
| Initial | 60.4 | — |
| 2 weeks/40° C./23% RH | 65.0 | 7.6 |
| 4 weeks/40° C./23% RH | 68.8 | 13.9 |

Change in Tape Accelerator Activity and/or Reactivity

A further measure that can be used for the storage stability of tape accelerator-containing mica tapes is the constancy in the tape accelerator activity and/or reactivity.

This can be detected by means of DSC. For this purpose, the exothermicity of reaction of a mica tape sample of 19-25 mm$^2$ with 8-9 mg of impregnating resin is measured by DSC.

A Mica Tape Specimen of the Composition
12.25 g/m$^{-2}$ Rokrapol 7075
2.00 g/m$^2$ Mowital BA55HH
1.00 g/m$^{-2}$ SAN-AID S1-150
shows no significant change in exothermicity of reaction and in the peak maximum compared to a mixture of 20% EP162 and 80% C2021P as impregnating resin after storage at 40° C. for 4 weeks.

Figure 22:
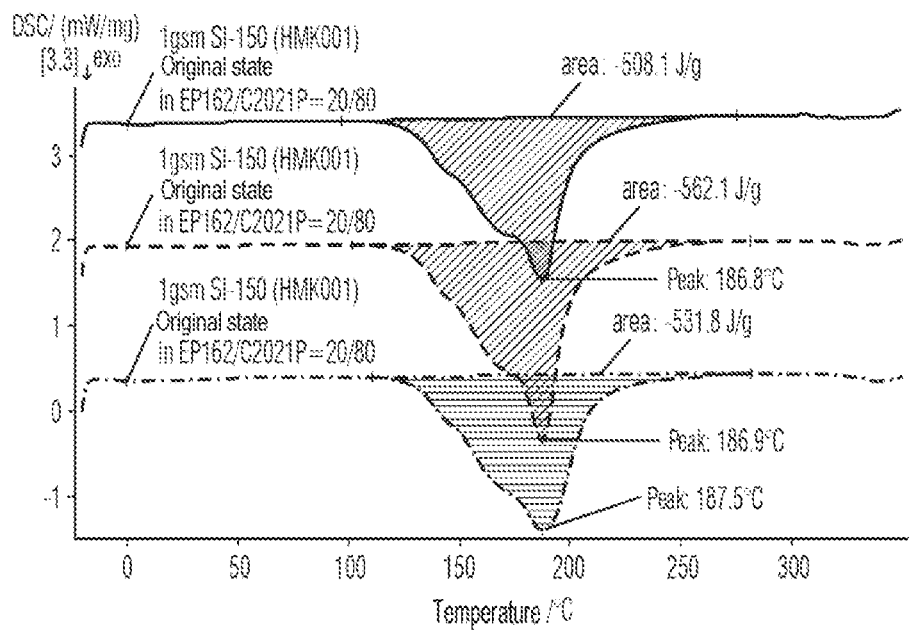
FIG. 22 shows the curing reaction of a mixture of 20% EP162 and 80% C2021P compared to a mica tape with a tape accelerator application of 1 g/m$^{-2}$ of SI-150.

FIG. 22 shows the curing reaction of a mixture of 20% EP162 and 80% C2021P compared to a mica tape with a tape accelerator application of 1 g/m$^{-2}$ of SI-150, without thermal aftertreatment of the mica tape specimen.

Figure 23:
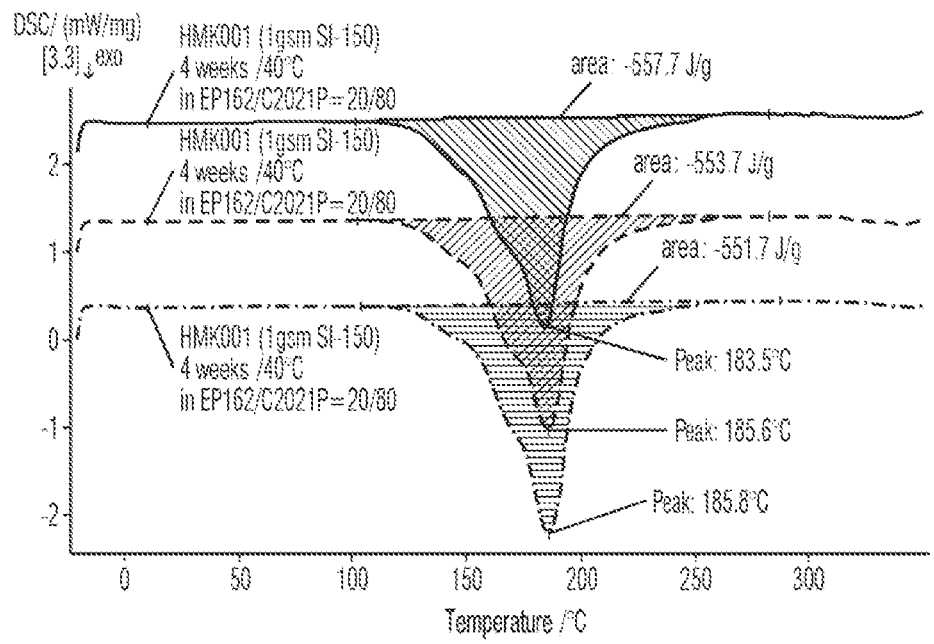
FIG. 23 shows the curing reaction of a mixture of 20% EP162 and 80% C2021P compared to a mica tape with a tape accelerator application of 1 g/m$^{-2}$ of SI-150.

FIG. 23 shows the curing reaction of a mixture of 20% EP162 and 80% C2021P compared to a mica tape with a tape accelerator application of 1 g/m$^{-2}$ of SI-150, with thermal storage of the mica tape specimens at 40° C. for 4 weeks.

Properties and advantages of the tape accelerator in combination with mica tape and anhydride-free impregnating resins with regard to range of accelerator coverage:

The range of coverage of the tape accelerator from the mica tape can be shown in a simple experiment. For this purpose, a mica tape sample with dimensions 400×25 mm is wound onto a mandrel of thickness 4 mm. The resultant roll is pulled off the mandrel and positioned by means of tweezers against the base curvature of a test tube; the test tube in the experiment was 16×160 mm and had thick walls. Then 4.4 g of preheated impregnating resin—e.g. 70° C.—was introduced. The impregnating resin gradually penetrates the roll, such that the base curvature and the gap in the roll are also filled. There remains a resin excess of ~10 mm.

The roll thus prepared is then subjected to the curing program in the air circulation oven and then assessed for through-curing, especially at the base, gap and excess, and the roll itself.

A mica tape specimen of the composition
12.25 g/m$^{-2}$ Rokrapol 7075
2.00 g/m$^{-2}$ Mowital BA55HH
1.00 g/m$^{-2}$ SAN-AID S1-150 shows complete curing of the roll and of all resin regions with a mixture of 20% EP162 and 80% C2021P as impregnating resin in this test.

Finally, the dielectric properties were examined to determine suitability in the insulation system. Electrical performance of such a mica tape in combination with an epoxy-based anhydride-free impregnating resin is also given. Thus, a mica tape of the composition:
12.25 g/m$^{-2}$ Rokrapol 7075
2.00 g/m$^{-2}$ Mowital BA55HH
1.00 g/m$^{-2}$ SAN-AID S1-150 in combination with a mixture of 20% EP162 and 80% C2021P as impregnating resin after 10 h/145° C. of curing gives an insulation system having a low electrical loss factor tan δ over a temperature range from room temperature to 155° C., as shown in FIG. 24.

Figure 24:
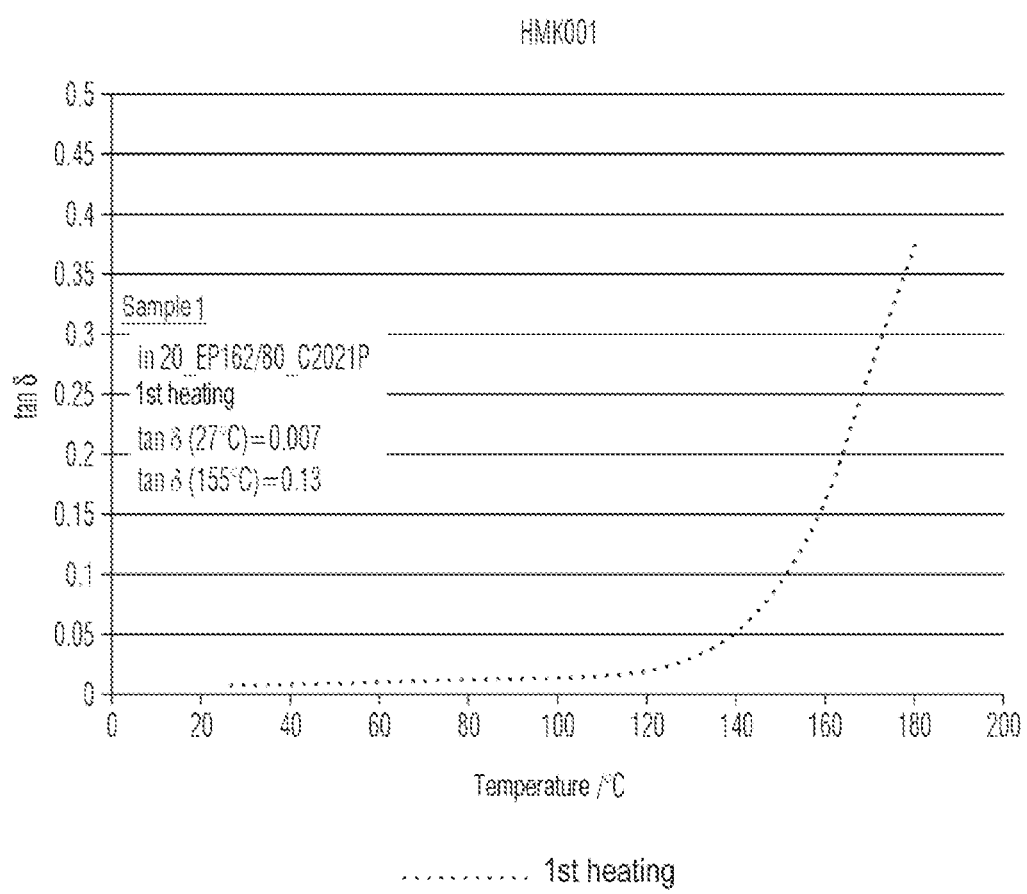
FIG. 24 is a trace showing the progression of the temperature-dependent loss factor of an insulation system composed of a mica tape sample according to one working example.

FIG. 24 shows the progression of the temperature-dependent loss factor tan δ of an insulation system composed of a mica tape sample according to one working example of the present invention with a tape accelerator application of 1 g per meter, impregnated with an impregnating agent comprising a mixture of 20% EP162 and 80% C2021P after final curing at 145° C. for 10 hours.

The teachings of the present disclosure include a solid insulation material with tape accelerator and optionally a matched tape adhesive, which gives a stable insulation system with a low number of defects with anhydride-free impregnating agent in a rapid and complete manner, even in regions that are low in tape accelerator, under the conditions, for example, of vacuum-pressure impregnation—VPI.

What is claimed is:

1. A cationic tape accelerator for use in a process for producing an insulation system by impregnation and/or encapsulation with an anhydride-free impregnating agent, the tape accelerator comprising:
    an ionogenic compound of a sulfonium-containing cation and a hexafluoroantimonate anion;
    wherein the sulfonium-containing cation comprises a substituted aryl group comprising a phenyl ring which is acetyloxy-substituted.

2. The tape accelerator as claimed in claim 1, wherein the sulfonium-containing cation includes an arylalkylsulfonium cation.

3. The tape accelerator as claimed in claim 1, wherein the sulfonium-containing cation includes a dialkylarylsulfonium cation and/or a diarylalkylsulfonium cation.

4. The tape accelerator as claimed in claim 1, having the following chemical structure:

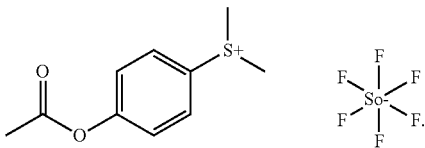

5. A solid insulation material comprising:
    a barrier material;
    a tape adhesive; and
    a tape accelerator comprising an ionogenic compound of a sulfonium-containing cation and a hexafluoroantimonate anion;
    wherein the sulfonium-containing cation includes a substituted aryl group comprising a phenyl ring which is acetyloxy-substituted.

6. The solid insulation material as claimed in claim 5, wherein the barrier material comprises platelets.

7. The solid insulation material as claimed in claim 4, further comprising a carrier.

8. The solid insulation material as claimed in claim 7, wherein the carrier comprises a weave, a nonwoven, a film, and/or a perforated film.

9. The solid insulation material as claimed in claim 5, wherein the tape adhesive includes a thermoplastic polyvinylacetal and/or a liquid polyester with hydroxy groups and/or carboxyl groups.

10. The solid insulation material as claimed in claim 9, wherein the tape adhesive includes a polyvinylacetal based on butyraldehyde and/or acetaldehyde.

11. An insulation system comprising:
    a winding of a solid insulation material impregnated with an anhydride-free impregnating agent comprising:
    a barrier material;
    a tape adhesive; and
    a tape accelerator comprising an ionogenic compound of a sulfonium-containing cation and a hexafluoroantimonate anion;
    wherein the sulfonium-containing cation includes a substituted aryl group comprising a phenyl ring which is acetyloxy-substituted.

12. An electrical machine comprising an insulation system as claimed in claim 11.

* * * * *